3,322,736
SHORTSTOP FOR EMULSION POLYMERIZATION
Walter Nudenberg, West Caldwell, Leonard T. Pappalardo, Morris Plains, and Hsiao-Jun Li, Morristown, N.J., assignors to Texas-U.S. Chemical Company, Parsippany, N.J., a corporation of Delaware
No Drawing. Continuation of application Ser. No. 202,092, June 13, 1962. This application July 21, 1965, Ser. No. 473,856
6 Claims. (Cl. 260—82.7)

This application is a continuation application of patent application Ser. No. 202,092, filed June 13, 1962.

This invention relates generally to the termination of the emulsion polymerization of synthetic rubber forming monomeric material. More particularly it relates to the termination, commonly called "shortstopping," of the synthetic rubber emulsion polymerization at a desired degree of conversion whereby further unwanted polymerization is prevented.

Sodium hydrosulfite (sodium dithionite), $Na_2S_2O_4$, has been mentioned as a shortstopping agent for synthetic rubber emulsion polymerizations in "Polymerization-Stopping Agents," by G. J. Antlfinger and C. H. Lufter, Ind. Eng. Chem., 45, 182–186 (January 1953). Sodium hydrosulfite has been examined at various times as a shortstopping agent but its use as a shortstop has not previously been seriously considered commercially because of its erratic behavior. It has been determined that sodium hydrosulfite does not adequately terminate the polymerization reaction.

We have found that sodium hydrosulfite and sodium hydroxide and sodium nitrite are an effective shortstop combination for synthetic rubber emulsion polymerizations and prevent any further polymerization after their addition. A practical limitation of sodium hydrosulfite as a shortstop is that on coagulation of the latex at pH's below 4.2 by conventional acid coagulation, after removal of unreacted monomers, objectionable sulfur dioxide fumes are liberated, which react with butadiene polymers and copolymers. The presence of the sodium nitrite prevents the formation of sulfur dioxide on acid coagulation of the rubber. The sodium nitrite is preferably added to the latex simultaneously with or subsequent to the addition of the sodium hydrosulfite and sodium hydroxide. The sodium hydrosulfite and sodium nitrite, without the sodium hydroxide, does not adequately terminate the polymerization reaction.

The amount of sodium hydrosulfite used will generally be from 0.1 to 1 part per 100 parts of polymerizable monomeric material originally present in the emulsion. The shortstop combination will comprise 0.5 to 3 mols of sodium hydroxide per mol of sodium hydrosulfite and 0.1 to 2 mols of sodium nitrite per mol of sodium hydrosulfite. The shortstop combination will generally be added in (2–10%) aqueous solution to the aqueous emulsion polymerizate after conversion of 50% to 80% of polymerizable monomers originally present to synthetic rubber. The shortstop combination may be added to the synthetic rubber latex to stop further polymerization before removal of any unreacted monomers. If the synthetic rubber latex is prepared from mixtures of low boiling monomers, such as butadiene and high boiling monomers, such as styrene, the butadiene may be vented from the reactor by reducing the pressure to atmospheric pressure before addition of the shortstop, after which the higher boiling monomers, such as styrene, may be recovered by conventional steam or vacuum distillation. In any case, the shortstop should be added to the latex after the desired polymerization of 50% to 90% conversion and while the latex still contains unreacted monomeric material.

The polymerizable material for the preparation of the synthetic rubber latex may be one or a mixture of butadiene-1,3 hydrocarbons, for example, butadiene-1,3,2-methylbutadiene-1,3 (isoprene), piperylene, 2,3-dimethylbutadiene-1,3. The polymerizable material as is known may be a mixture of one or more of such butadiene-1,3 hydrocarbons with one or more other polymerizable compounds which are capable of forming rubbery copolymers with butadiene-1,3 hydrocarbons, for example, up to 60% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, vinyl toluene, alpha methyl styrene, and vinyl naphthalene; the alpha methylene carboxylic acids, and their esters, nitriles and amides, such as acrylic acid, methyl acrylate, methyl methacrylate, acrylonitrile, methacrylamide; vinyl pyridines, such as 2-vinyl pyridine, 2-methyl-5-vinyl pyridines; methyl vinyl ketone; vinylidene chloride. Commercial SBR latices, which are illustrated in the examples below, are latices of copolymers of butadiene-1,3 and styrene, generally of a major proportion of butadiene-1,3 and a minor proportion of styrene. The emulsifiers for emulsifying the monomers in water will comprise conventional soap emulsifiers such as the water soluble (alkali metal, ammonium or amine) soaps of soap-forming monocarboxylic acids, e.g., alkali soaps of fatty acids having 10 to 24 carbon atoms in so-called fatty acid soap recipes, or alkali soaps of abietic (rosin) acid, including dehydrogenated, hydrogenated and disproportionated rosin soaps in so-called rosin acid soap recipes. Such soaps will conventionally be in amount from 2 to 10 parts per 100 parts of polymerizable monomers. The temperature of polymerization may be from 0° F. to 200° F., an antifreeze, such as methanol, being used at temperatures below 32° F. Commercial so-called cold polymerizations take place at about 41° F. and so-called hot polymerizations take place at about 122° F. The catalysts (initiators) used may be the conventional peroxygen catalysts, such as inorganic persalts which are commonly used in hot polymerizations, e.g. alkali persulfates, and organic peroxides which are commonly used on cold polymerizations, e.g. diacetyl peroxide, dibenzoyl peroxide, acetyl benzoyl peroxide, tertiarybutyl hydroperoxide, cumene hydroperoxide, para-menthane hydroperoxide, para-cymene hydroperoxide, cyclohexyl benzene hydroperoxide, diisopropyl benzene hydroperoxide. Where the crude synthetic rubber is to be recovered from the latex after removal of unreacted polymerizable monomers, the latex is coagulated by conventional means, e.g. by reducing the pH of latex which has a pH of about 8 to 11 from the soap emulsion polymerization to below 4.2, as by acid coagulation on addition to the latex of sodium chloride and sulfuric acid.

The following examples illustrate the invention. All parts and percentages referred to herein are by weight.

EXAMPLE I

Polymerization bottles were charged with the following recipe:

| | Parts |
|---|---|
| Butadiene-1,3 | 71.0 |
| Styrene | 29.0 |
| Water | 195.0 |
| Dresinate 515 (potassium rosin acid soap) | 4.5 |
| Tripotassium phosphate ($K_3PO_4$) | 0.43 |
| Tamol N (sodium salt of condensed aryl sulfonic acid) | 0.13 |
| Sodium dithionite ($Na_2S_2O_4$) | 0.026 |
| Sulfole (tertiary dodecyl mercaptan) | 0.10 |
| EDTA (trisodium salt of ethylenediamine tetraacetic acid) | 0.06 |
| Ferrous sulfate heptahydrate ($FeSO_4 \cdot 7H_2O$) | 0.017 |
| SFS (sodium formaldehyde sulfoxylate dihydrate) | 0.048 |
| PMHP (para-menthane hydroperoxide) | 0.032 |

The charged bottles were revolved end over end in a bath at 5° C. (41° F.). At the end of about five hours polymerization 0.2 part of sodium hydrosulfite, 0.05 part of sodium hydroxide and 0.02 part of sodium nitrite in about 3.5 parts of water were added to the polymerized latex which was at 70.6% conversion. The latex was then aged at 40° C. to 50° C. for 17 hours, at which time the conversion was 66.5%, showing that the sodium hydrosulfite, sodium hydroxide, and sodium nitrite combination effectively shortstopped the polymerization. Controls (replicate samples) using no shortstop went to 98% conversion after aging as above.

EXAMPLE II

Samples of the polymerization charge of Example I were revolved end over end in a bath at 5° C. (41° F.) for about four hours. At the end of these four hours of polymerization, 0.2 part of sodium hydrosulfite and 0.02 part of sodium nitrite in about 3.5 parts of water were added to a replicate set of bottles of the polymerized latex which was at 79.2% conversion. The latex was then aged at 5° C. to 17° C. for 14 hours, at which time the conversion increased to 92.1%, showing that the sodium hydrosulfite and sodium nitrite did not effectively shortstop the polymerization.

EXAMPLE III

Polymerization bottles were charged with the following recipe:

| | Parts |
|---|---|
| Butadiene-1,3 | 71.0 |
| Styrene | 29.0 |
| Water | 170.0 |
| SF flakes (sodium fatty acid soap) | 4.2 |
| n-Dodecyl mercaptan | 0.325 |
| Potassium persulfate | 0.23 |

The charged bottles were revolved end over end in a bath at 50° C. (122° F.). At the end of about nine hours polymerization, 0.2 part of sodium hydrosulfite and 0.05 part of sodium hydroxide and 0.02 part of sodium nitrite in about 3.5 parts of water were added to each of two bottles of the polymerized latex which were at 65.6% and 66.6% conversion, respectively. The latices were then aged at 38° C. to 50° C. for 53 hours, at which time the conversions were 67.1% and 68.3%, respectively, showing that the sodium hydrosulfite and sodium hydroxide and sodium nitrite combination effectively shortstopped the polymerizations.

EXAMPLE IV

Replicate samples of the polymerization charge of Example III revolved end over end in a bath at 50° C. (122° F.), were also treated with only sodium hydrosulfite and sodium nitrate, as follows: at the end of about nine hours polymerization, 0.2 part of sodium hydrosulfite and 0.02 part of sodium nitrite in about 3.5 parts of water was added to each of two bottles of the polymerized latex which were at 68.1% and 67.2% conversion respectively. The latices were aged at 38° C. to 50° C. for 53 hours at which time the conversions increased to 91.0% and 90.5%, respectively, showing that the sodium hydrosulfite and sodium nitrite did not effectively shortstop the polymerizations under the same conditions that the combination of Example II was effective.

EXAMPLE V

In plant experimental runs of butadiene-styrene copolymer latices prepared from the recipe of Example III, the Mooney viscosity rise of the synthetic rubber from the short-stopped latex in the reactor to the blend tank after removing unreacted butadiene and styrene was determined, using conventional sodium dimethyl dithiocarbamate shortstop and the shortstop combination of the present invention. The Mooney viscosity of the synthetic rubber in the latex is determined by taking a sample of the latex, coagulating the sample with sodium chloride and sulfuric acid and drying the coagulated rubber, and then measuring the so-called Mooney viscosity on a Mooney Shearing Disc Plastometer or Viscometer as described by Mooney in Ind. Eng. Chem. (Analytical Edition) 6, 147 (1934). The results are given as Mooney viscosities on an arbitrary scale. The polymerizations were shortstopped at about the optimum Mooney viscosity of 50 as measured with the large rotor supplied with the instrument after four minutes between the platens of the instrument at 212° F., a one minute warm up time being used. (A.S.T.M. Standards on Rubber Products, D-927-49T). A rise in Mooney viscosity from the shortstopped value is undesirable. A deficiency common to currently used shortstops is that they allow a 5 to 10 point Mooney rise during monomer recovery. With 0.15 part of sodium dimethyldithiocarbamate shortstop per 100 parts of original monomers, which is the amount used commercially, the Mooney viscosity rise was 7.5 to 9.5 points. With varying amount of sodium hydrosulfite from 0.25 to 0.60 part per 100 parts of original monomers in combination with one-fourth as much sodium hydroxide by weight as sodium hydrosulfite and one-tenth as much sodium nitrite by weight as sodium hydrosulfite, the Mooney viscosity rise was only 1.5 to 4 points, showing the superiority of the shortstopping agent of the present invention.

In view of the many changes and modifications that may be made without departing from the principles underlying the invention, reference should be made to the appended claims for an understanding of the scope of the protection afforded the invention.

What is claimed is:

1. In the aqueous emulsion polymerization of synthetic rubber forming monomeric material selected from the group consisting of butadiene-1,3 hydrocarbons and mixtures of butadiene-1,3 hydrocarbons with compounds which contain a $CH_2\!=\!C\!<$ group and are copolymerizable with butadiene-1,3 hydrocarbons, the improvement which comprises adding to the reaction mixture during polymerization of the synthetic rubber forming monomeric material, the combination of alkali metal hydrosulfite, hydroxide and nitrite to terminate the polymerization reaction, the amount of added alkali metal hydrosulfite being from 0.1 to 1 part by weight per 100 parts by weight of polymerizable monomeric material originally present, the added alkali metal hydroxide being from 0.5 to 3 mols per mol of added alkali metal hydrosulfite and the added alkali metal nitrate being from 0.1 to 2 mols per mol of added alkali metal hydrosulfite.

2. The process of claim 1 in which the synthetic rubber forming monomeric material comprises a mixture of butadiene-1,3 and styrene.

3. In the preparation of synthetic rubber latex by the aqueous emulsion polymerization of synthetic rubber forming monomeric material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the improvement which comprises adding to the latex before complete conversion of polymerizable monomeric material originally present to synthetic rubber and while the latex contains unreacted polymerizable monomeric material, sodium hydrosulfite, sodium hydroxide and sodium nitrite, the amount of added sodium hydrosulfite being from 0.1 to 1 part by weight per 100 parts by weight of polymerizable monomeric material originally present, the added sodium hydroxide being from 0.5 to 3 mols per mol of added sodium hydrosulfite and the added sodium nitrite being from 0.1 to 2 mols per mol of added sodium hydrosulfite.

4. The process of claim 3 in which the synthetic rubber forming monomeric material comprises a mixture of butadiene-1,3 and styrene.

5. In the preparation of synthetic rubber latex by the aqueous emulsion poloymerization of synthetic rubber forming monomeric material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons, the improvement which comprises adding to the latex after conversion of 50% to 90% of polymerizable material originally present to synthetic rubber and while the latex contains unreacted polymerizable monomeric material sodium hydrosulfite, sodium hydroxide and sodium nitrite, the amount of added sodium hydrosulfite being from 0.1 to 1 part by weight per 100 parts by weight of polymerizable monomeric material originally present, the added sodium hydroxide being from 0.5 to 3 mols per mol of added sodium hydrosulfite and the added sodium nitrite being from 0.1 to 2 mols per mol of added sodium hydrosulfite.

6. The process of making synthetic rubber which comprises polymerizing an aqueous emulsion of synthetic rubber forming monomeric material selected from the group consisting of butadiene-1,3 hydrocarbons and mixtures of butadiene-1,3 hydrocarbons with compounds which contain a $CH_2=C<$ group and are copolymerizable with butadiene-1,3 hydrocarbons to produce a synthetic rubber latex having a pH from 8 to 11, adding to the latex after conversion of 50% to 90% of polymerizable monomeric material originally present to synthetic rubber and while the latex contains unreacted polymerizable material, sodium hydrosulfite, sodium hydroxide and sodium nitrite, the amount of added sodium hydrosulfiite being from 0.1 to 1 part by weight per 100 parts by weight of polymerizable monomeric material originally present, the added sodium hydroxide being from 0.5 to 3 mols per mol of added sodium hydrosulfite and the added sodium nitrite being from 0.1 to 2 mols per mol of added sodium hydrosulfite, thereafter removing the residual unreacted monomeric material, and coagulating the synthetic rubber in the latex by reducing the pH of the latex to below 4.2.

References Cited
UNITED STATES PATENTS

| 2,378,695 | 6/1945 | Fryling | 260—82.7 |
| 2,613,175 | 10/1952 | Johnstone, et al. | 202—57 |

OTHER REFERENCES

Hobson et al., Industrial and Engineering Chemistry, Vol. 42, No. 8, Aug. 1950, pp. 1572–1577.

MURRAY TILLMAN, *Primary Examiner.*

J. T. GOOLKASIAN, J. ZIEGLER, *Assistant Examiners.*